LORAN F. McCORMICK
*INVENTOR.*

*BY* ROY MILLER
ATTORNEY.
GERALD F. BAKER
AGENT.

PHASE LOCK SYSTEM FOR CODED SIGNAL RECEIVER

Filed Dec. 1, 1967 7 Sheets-Sheet 3

United States Patent Office
3,462,702
Patented Aug. 19, 1969

3,462,702

PHASE LOCK SYSTEM FOR CODED SIGNAL RECEIVER

Loran F. McCormick, Canoga Park, Calif., assignor to the United States of America as represented by the Secretary of the Navy Filed Dec. 1, 1967, Ser. No. 687,333
Int. Cl. H03b 3/04
U.S. Cl. 331—18 4 Claims

ABSTRACT OF THE DISCLOSURE

A phase lock loop is provided between a phase modulated receiver and decoding circuitry to provide reliable input signals and gating signals to the decoding circuitry under adverse signal to noise ratio conditions. The signal from the phase detector of the receiver, after passing through an emitter follower, is rectified and the resultant signal is passed through another emitter follower to an amplifier. This amplifier has a degenerative feedback loop containing a notch filter tuned to the fundamental frequency of the signal so that the feedback greatly attenuates all but the fundamental signal. The output of the amplifier passes through a diode limiter with a clipping level selected to allow high sensitivity in downstream stages. A high gain amplifier is used to drive a phase comparison circuit which compares the difference in phase between the signal from the feedback amplifier and the signal from a voltage controlled oscillator driven by a phase difference related voltage from the comparison circuit. An ammeter is connected to indicate a DC level based on the average of the gated input and shows a constant amplitude when the system is locked onto the input signal.

Government interest

The invention described herein may be manufactured and used by or for the Government of the United States of America for governmental purposes without the payment of any royalties thereon or therefor.

Cross-reference to related application

The phase lock loop according to the present invention is a component part of the NACODE Satellite Time Recovery Unit disclosed in patent application Ser. No. 679,060, filed Oct. 30, 1967, Loran M. McCormick et al.

Background of the invention

In the construction of a receiver for decoding signals from orbiting satellites, it was recognized that in order for the unit to identify the coded signal and separate it from the other data being transmitted, proper synchronization was necessary between internally generated signals and the signal to be decoded.

The basic function of the NACODE Satellite Time Recovery Unit is that of issuing an output pulse a specific length of time after a coded signal has been received from a satellite. The unit must, therefore, decode this signal, identify and separate it from the other data being transmitted from the satellite, establish the proper time between identification and issuance of the pulse, then issue the pulse. The Phase Lock Loop gives the recovery unit the capability of ensuring that it is properly synchronized with the input signals to be certain that the coded signal can be decoded.

Summary of the invention

The Phase Lock Loop according to the present invention produces "gating signals" and synchronizes the gating signals to the input signals. This condition is known as "lock" and occurs whether or not the system is IN BIT SYNC.

The input signal is rectified after passing through the input emitter follower, and the resultant modulated DC signal is passed through another emitter follower to an amplifier. The amplifier has a degenerative feedback loop containing a notch filter. The notch is tuned to the fundamental frequency of the signal and the feedback thus greatly attenuates all but the fundamental signal. Circuit gain is low to prevent circuit oscillation.

The output of the feedback amplifier is passed through a diode limiter for clipping. The clipping level of the limiter is selected to allow high sensitivity in downstream stages, permitting the circuit to function at low signal levels and still permit high amplitude input signals. The clipping level is such that almost all signals passing through the limiter are slightly clipped. Waveform is not critical at this point.

The next stage is a high-gain amplifier stage. This is used to drive the area comparator. The area comparator (a phase comparison circuit) compares the difference in phase between the signal from the amplifier stage and the signal from a voltage controlled oscillator (VCO). The area comparator provides the driving voltage for the VCO. This voltage is dependent upon the phase difference between the two signals, i.e., the signal from the VCO after going through the frequency dividers and the input signal.

Brief description of the several views of the drawing

As stated above, the phase lock loop was designed as a component of a receiving system known as the NACODE Satellite Time Recovery Unit. FIG. 1 is a simplified block diagram of that system and illustrates the relationship of the Phase Lock Loop to other components of that system.

As shown in FIG. 1 of the drawing, the output of a phase modulated receiver 50 is connected to the Analog Section 12. The Analog Section converts doublet-coded information signals from receiver 50 into time and data pulses which can be used by the Digital Section 14. The actual search for the coded signal occurs in the Digital Section 14 where a bit-by-bit comparison of the incoming signal against the internally generated Comparison Signal is made. When the sought after coded signal is located, the Digital Section times and issues the fiducial output pulse. The Test Section is used to check the unit for proper operation.

Analog section

Figures 1, 1A:
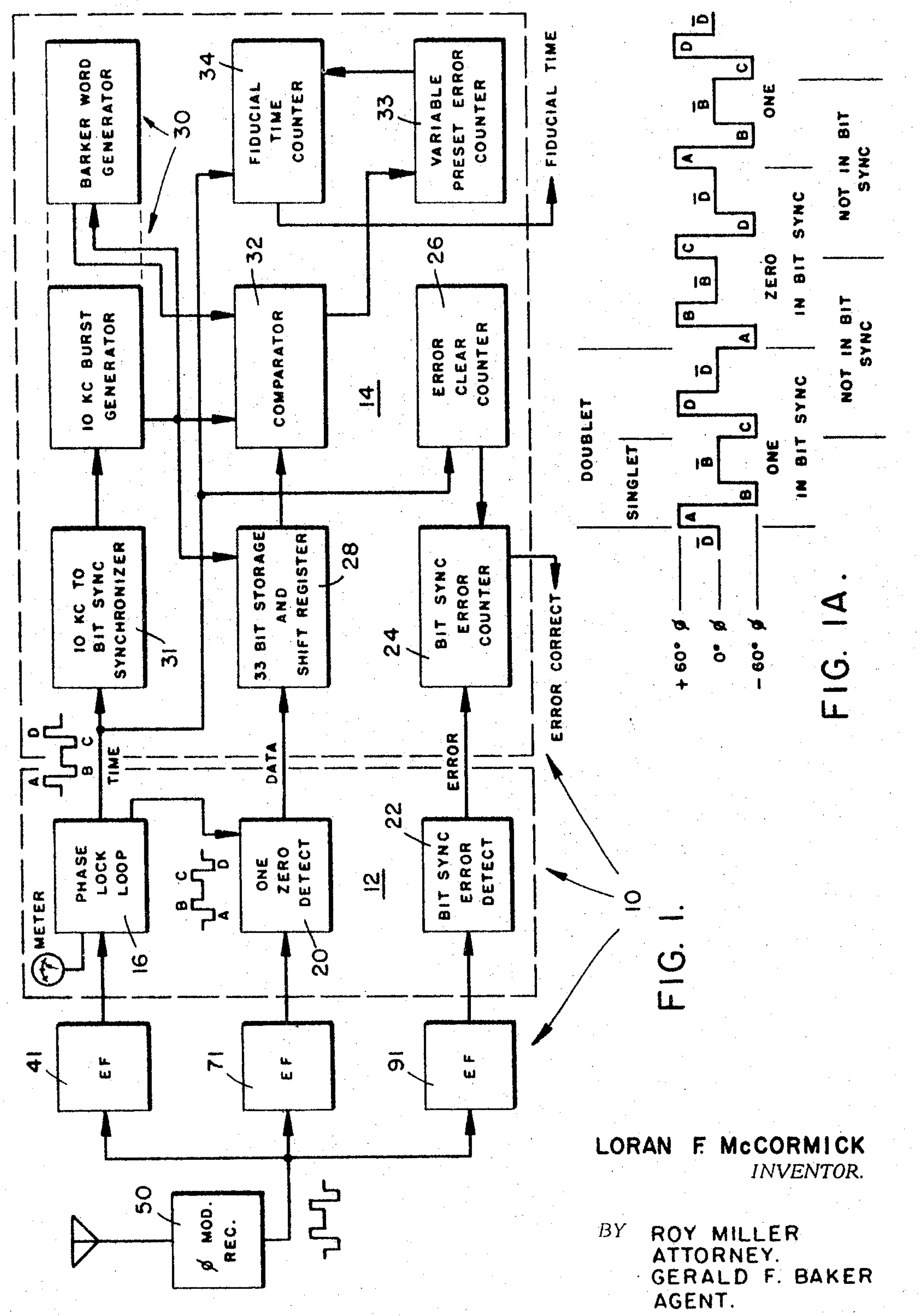
FIG. 1 is a simplified block diagram of the receiving system incorporating the phase lock loop.
FIG. 1A is a diagrammatic representation of the basic input waveform.
Figure 2:
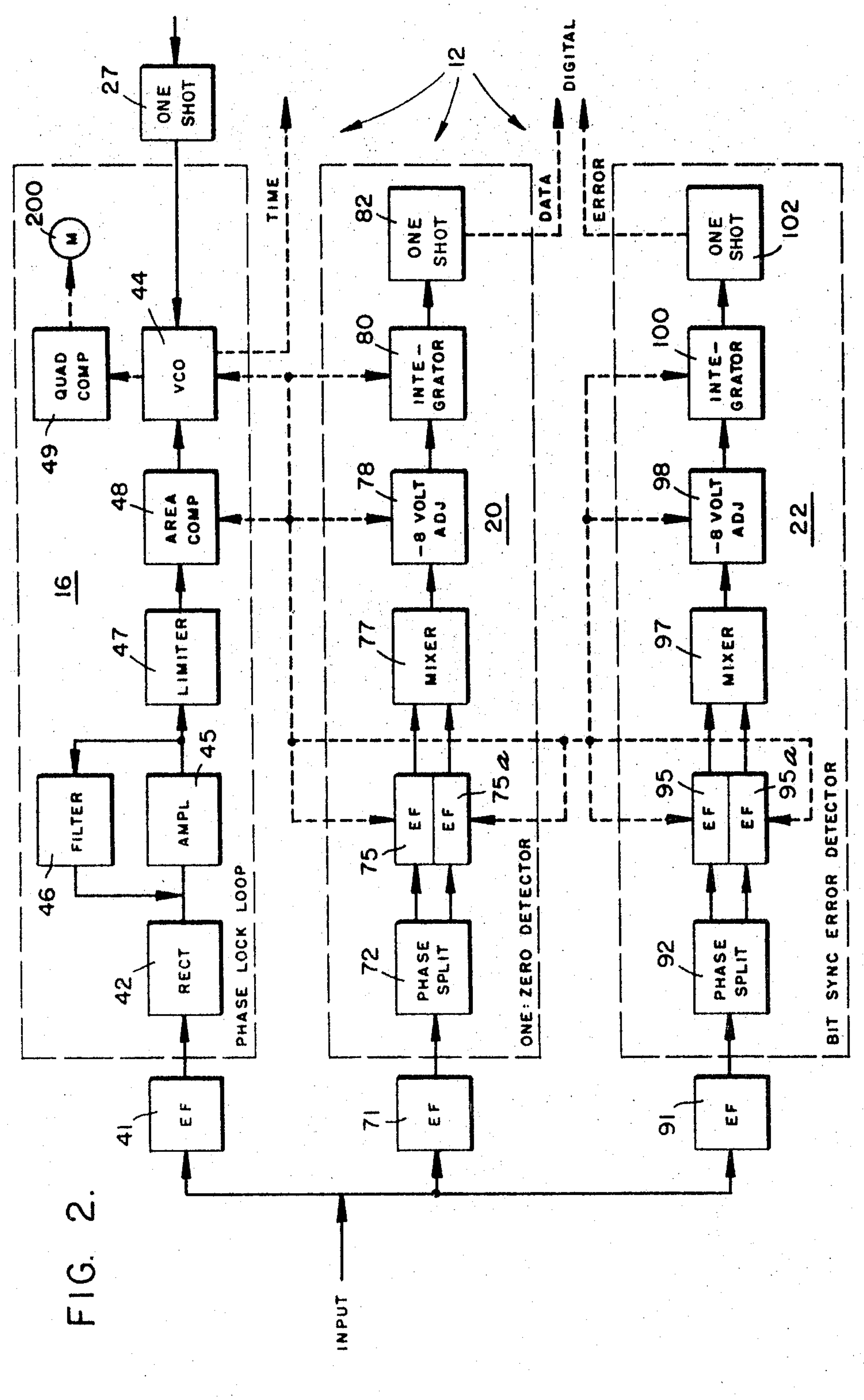
FIG. 2 is a simplified block diagram of the Analog Section of the receiver of FIG. 1.
Figures 3, 3A, 3B:
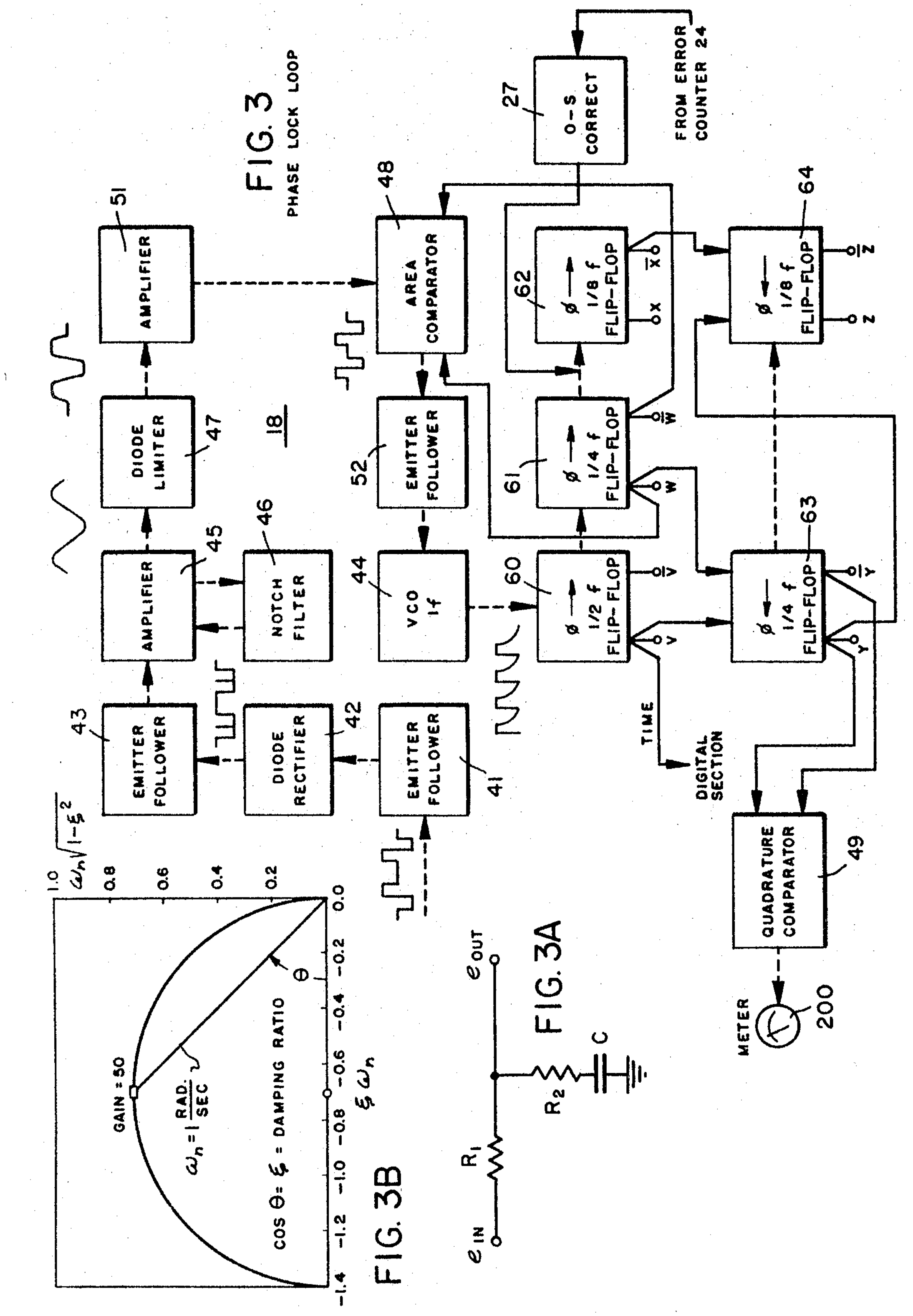
FIG. 3 is a block diagram of the phase lock loop.
FIG. 3A is a circuit diagram of the filter not the phase lock loop.
FIG. 3B is a graph showing the root locus plot for the phase lock loop.

Refering now more particularly to FIGS. 1, 2 and 3, it may be seen that the input to the Analog Section is applied through three emitter follower stages EF 41, 71, 91 which serve to isolate the inputs from each other and to match the impedance of the inputs to the downstream circuitry. The input signal arrives in the form of a coded series of phase-modulated positive and negative going bits. Each character consists of a phase modulated pulse with a 60-degree deviation followed immediately by a pulse of equal magnitude but opposite phase (see FIG. 1A). This is followed by a period, the duration of which is equal to the two preceding pulses, but a 0-degree deviation. The complement of the first pulse, followed by a 0-degree deviation equal to these two pulses then follows. FIG. 1A illustrates the shape of the input signal from the phase detector in the Phase-Modulated Receiver. The output of the receiver is supplied as the input of the Time Recovery Unit in the same essential form. FIG. 2 is a simplified block diagram of the Analog Section of the unit.

Phase lock loop

The Phase Lock Loop 18 synchronizes the "gating signals" to the input signal. This condition is known as LOCK and occurs whether or not the system is in BIT SYNC. The gating signals are the product of the Phase Lock Loop.

The input signal is rectified by diode rectifier 42 after passing through the input emitter follower 41, and the resultant modulated DC signal is passed through another emitter follower 43 into an amplifier 45. This amplifier has a degenerative feedback loop containing notch filter 46. The notch is tuned to the fundamental frequency of the signal and the feedback thus greatly attenuates all but the fundamental signal. Circuit gain is low in order to prevent oscillation.

The output of the feedback amplifier 45 is passed through a diode limiter 47. The clipipng level of the limiter is selected to allow high sensitivity in downstream stages, permitting the circuit to function at low signal levels and still permit high amplitude input signals. The clipping level is such that almost all signals passing through the limiter are slightly clipped. Waveform is not critical at this point in the circuit.

The next stage is a high-gain amplifier stage 51. This is used to drive the area comparator 48. The area comparator 48 (a phase comparison circuit) compares the difference in phase betwen the signal from the amplifier stage and the signal from a voltage controlled oscillator VCO 44. The area comparator 48 provides a driving voltage for the VCO 44. This voltage is dependent upon the phase difference between the two signals. Drive to the VCO passes through the emitter follower 52.

The VCO 44 drives five flip-flop frequency dividers 60, 61, 62, 63, 64. Three of the dividers are out of phase with the original input signal, and two are in phase with the original input signal. The out-of-phase flip-flops run at ½, ¼, and ⅛ the frequency (*f*) of the VCO. The in-phase flip-flops run at ¼*f* and ⅛*f*. Each flip-flop produces two outputs as identified in Table 1. These flip-flop outputs are the gating signals for the remainder of the Analog Section and the BIT SYNC CLOCK pulses for the Digital Section.

TABLE 1.—GATING SIGNALS

| Flip-Flop | Frequency Divider Flip-flop Output Coding Designations: Normal | Complement |
|---|---|---|
| 1/2f, out of phase | V | $\overline{V}$ |
| 1/4f, out of phase | W | $\overline{W}$ |
| 1/8f, out of phase | X | $\overline{X}$ |
| 1/4f, in phase | Y | $\overline{Y}$ |
| 1/8f, in phase | Z | $\overline{Z}$ |

LOCK meter driver

A quadrature comparator 49, driven by the Y and $\overline{Y}$ outputs of the ¼*f* in-phase flip-flop 63, drives a LOCK meter 200. The meter indicates LOCK when it stabilizes at a high level reading.

General

The NACODE Satellite Time Recovery Unit was designed to decode a phase modulated signal having a signal-to-noise ratio of −12 db in a 3 kc. bandwidth. The decoding circuits in the Analog Section 12 require a series of gating signals which are synchronized to the input phase modulated signal. In addition, the input signal carries a timing marker which starts a digital counter. This marker must be detected within ±0.1 millisecond of its actual occurrence.

The approach taken in decoding the phase modulated signal received by the NACODE Satellite Time Recovery Unit involves the use of an Analog Section 12 which consists of three main parts: The Phase Lock Loop 16, the ONE:ZERO Detector 20 and the BIT SYNC Error Detector 22. The VCO 44 in the Phase Lock Loop 16 is locked to the phase modulated signal and the VCO provides the gate signals for the ONE:ZERO and BIT SYNC Error Detectors 20, 22. The ONE:ZERO Detector 20 generates a pulse which corresponds to a binary bit ONE. The BIT SYNC Error Detector 22 establishes and maintains the proper phase relationship (BIT SYNC in-phase) between the incoming phase modulated signal and the gate signals. The outputs of the ONE:ZERO Detector 20 and the BIT SYNC Error Detector 22 in the Analog Section 12 are connected to the inputs of the Digital Section 14.

The Digital Section 14 uses four binary counters, a shift register 28, a pseudo-random pattern generator, and an EXCLUSIVE OR gate to establish a confidence level in case of loss of BIT SYNC, to identify the coded time message and to issue the precisely timed output pulse.

The Test Section contains two pseudo-random pattern generators and a doublet timer to enable simulation of a satellite signal for the entire system or any part thereof.

Analog Section

The following paragraphs describe the Analog Section 12 (FIG. 2) of the Time Recovery Unit. The section decodes the doublet binary bits in the transmissions, for example, from a satellite. The Analog Section is composed of two principal parts, a Phase Lock Loop 16 for acquiring the signal at −12 db signal-to-noise ratios in a 3 kc. bandwidth, and a detection circuit composed of a ONE:ZERO Detector 20 and a BIT SYNC Error Detector 22 for bit synchronization and doublet decoding.

The Phase Lock Loop 16 is designed using the damping ratio ($\xi$) and the undamped natural frequency ($\omega_n$) as parameters. Since the loop must also lock onto a noisy signal (signal-to-noise power ratio of −12 db in a 3 kc. bandwidth), the effects of noise on the system are considered. It will be found that the noise bandwidth of the loop is 0.11 c.p.s. and the final signal-to-noise (S/N) power ratio is +20 db. An S/N ratio of 10 db was considered sufficient to quickly acquire LOCK. Smaller S/N ratios will still lock, however, they will take longer time.

The detection circuit is composed of two parts. The first part discussed is the BIT SYNC Error Detector 22. This circuit establishes and maintains the correct phase relationship between the incoming doublet and the Phase Lock Loop 16. The second part 20 of the circuit detects the doublet bit which represents a ONE and produces an output pulse. When a ZERO is detected, there is no output.

Both circuits transform the input into a square wave which feeds an RC integrator. The integrator is necessary to average out noise when the input S/N ratio drops towards the −12 db minimum. The polarity of the square wave regulates the direction of charge such that a positive charge produces a pulse output from both circuits.

PHASE LOCK LOOP

Circuit description

Figure 4:
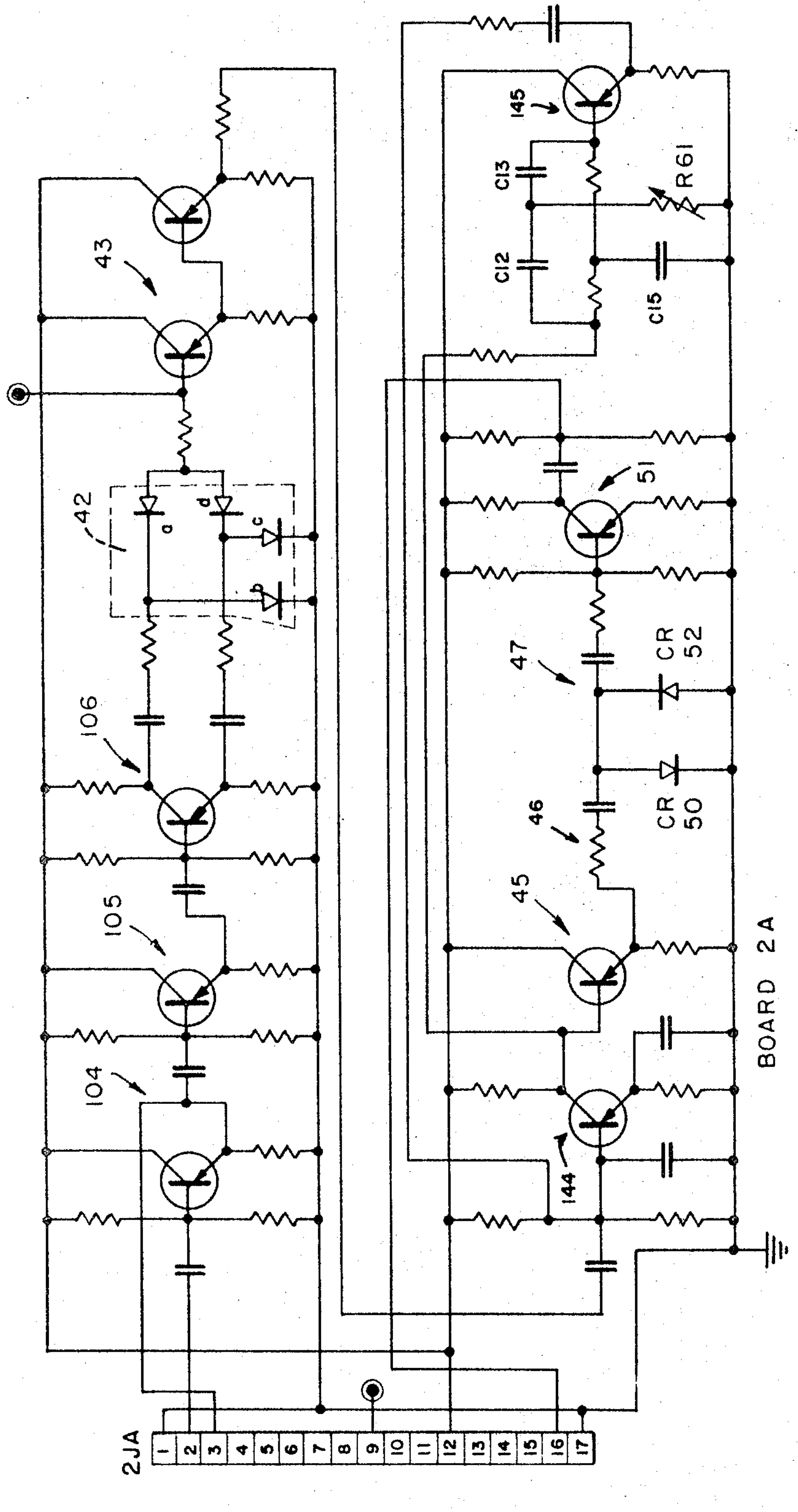
FIGS. 4 through 7 are schematic diagrams of circuit boards 2A, 2B, 2E and 2F, which constitute the phase lock loop.

The schematic for the first part of the circuit is shown in FIG. 4. The doublet wave-form enters the high input impedance emitter follower, transistor 104, and goes into an amplifier, transistor element 105, and diode circuit 42. Transistor element 106 is used as a phase inverter and with the diodes of circuit 42 change the doublet into a square-wave. Referring to the doublet in FIG. 1A, part A of the wave-form becomes negative at the collector of transistor 106 back biasing diode **42*b* and passing through diode 42*a*. At the emitter of transistor 106 the doublet remains positive and is shunted to ground through diode 42*c*. The next part of the doublet, B, becomes positive at the collector of 106 and goes to ground through diode 42*b* while the negative emitter signal passes through 42*d*. The sume of A and B forms the low portion of a square-wave while part $\overline{B}$ and $\overline{D}$ of the doublet forms the positive portion, thus producing a square-wave at twice the doublet frequency. This goes through an emitter follower, circuit 43**, in order to prevent loading from the following circuits.

The next circuit is an amplifier and notch filter combination, comprising transistors 144, 145 and capacitors C12, C13 and C15. The bandwidth of this circuit is 20 cycles adjusted by R61 to center around the input square-wave frequency. This circuit helps to filter some of the noise during high noise conditions. The output now a sine wave goes through a diode limiter CR50 and CR52 for noise suppression and wave shaping. This limited signal is amplified by transistor element 51 before going into the phase lock loop.

Figure 5:
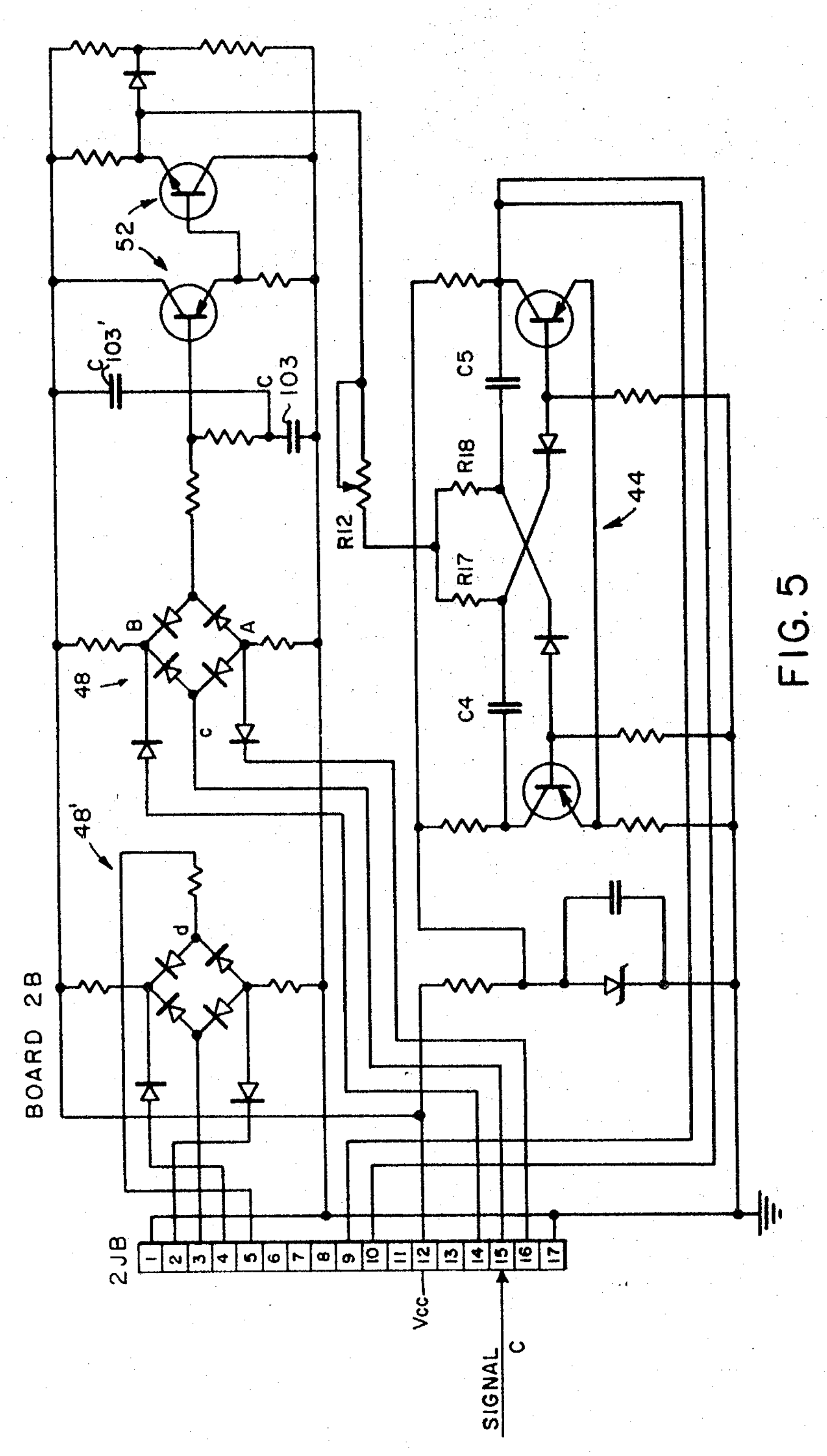

The schematic for the phase lock loop is shown in FIG. 5. It consists of a group of diodes 48 which gate a portion of the input signal to two storage capacitors (C103, C103') which retain a voltage to control the frequency of a voltage controlled oscillator (VCO) circuit 44. The VCO gates flip flops in FIGS. 6 and 7 in order to have a gating signal every 90° of the input wave-form for the One-Zero and Bit-Sync detector. The VCO is synchronized at 4 times the input square-wave frequency.

The operation of the phase lock loop is best explained by taking the static condition where the VCO, circuit 44, is locked with respect to the input frequency. The input frequency enters the diode gates, circuit 48, at point C in FIG. 5. The gate is controlled by flip-flop circuit 61 with a switching rate equal to the input frequency. When the gate at point A is near ground potential and the gate at B is near the power supply voltage V*cc*, then the input frequency is allowed to pass as shown in the area comparator's wave-form in FIGURE 3, Block 48. The gates are chosen such that they are 90° out of phase with the input frequency allowing the last half of the high voltage portion of the input frequency and first half of the low voltage portion to pass. The gate cuts off the input during the remaining portion of the wave. The output from circuit 48 becomes a DC voltage due to the action of storage capacitors C103 and C103'. Emitter follower Circuit 52 prevents loading by the VCO. Should the input frequency change slightly or shift phase, gate 48 will not open at the proper time causing more or less of the positive input signal to pass. This will change the charge on the capacitors, C103, C103' and subsequently change the voltage at the input to the VCO, Circuit 44, changing its frequency so as to once again be synchronized with the input signal. It can also be seen that the area comparator, VCO circuit, would be satisfied if gates at A and B were 270° out of phase with input. However, this condition is unstable because changes from the locked condition change the charge on capacitors C103 and C103', but out of phase with respect to proper operation. This causes the VCO, Circuit 44, to shift frequency in the wrong direction thus changing the gate position at A and B further away from the input frequency. This continues until the gates at A and B change 90° with respect to the input. Further gate phase changes will now change the charge on capacitors C103 and C103' to shift the VCO frequency back towards the input frequency until a locked or 90° position with respect to the input wave shape is attained.

The input frequency for this particular circuit is 100 c.p.s.; however, the circuit is not limited to this value. Any audio signal can be applied to the input of the phase lock loop and the VCO 44 will track it providing the appropriate resistors, R17 and R18, and capacitors, C4 and C5 are chosen such that the VCO's frequency is approximately 4 times the expected input.

The VCO, having a frequency 4 times greater than the input, has a sharp leading edge to trigger gating flip-flops at every 90° of the input signal. In this particular case, the area comparator 48 is switched so that the area under the upper part of the curve (above ½ V*cc* voltage) is equal to the area under the lower portion. Thus the gates occurring at ±90° with respect to the input signal are used in the area comparator. The actual phase synchronization is adjusted by means of potentiometer R12 in the VCO. Varying R12 changes the frequency of the VCO for a constant control voltage. Thus if R12 is changed so that a higher control voltage is now required in order to obtain the input frequency, then a greater portion of the input sine wave must be above ½ V*cc* during the time that the gate is opened. In fact the circuit will now lock so that the gate is no longer at 90° but will actually lead the 90° point on the input sine wave. Thus, if desired by adjusting R12, the VCO can be locked to any phase angle with respect to the input sine wave.

The remaining circuits 60, 61, 62 and 2 JD and 63, 64 27 on board 2 JF are just gating flip-flops for use in the one-zero and bit-sync detector. These flip-flops use emitter follower outputs to prevent loading by other circuits. In addition, the diode at the base of each transistor prevents false triggering and provides some temperature compensation.

Detailed analysis

This analysis of the Phase Lock Loop 16 covers: (1) a root locus approach to the design (FIG. 3B), (2) errors caused by various types of inputs, and (3) noise bandwidths associated with the design. The circuits involve the input to the loop 16, which modifies the doublet from the receiver 50 so that it resembles a square wave, followed by the circuits which satisfy the loop design.

It has an open loop transfer function:

$$\frac{e_{out}}{e_{in}}=\frac{R_2Cs+1}{(R_1+R_2)Cs+1}$$

where $s$=Laplace transform of the complex frequency variable.

The VCO 44 is the last component to consider. Neglecting gain, it has a transfer function of approximately 1/s. The overall open loop gain can be lumped together and called K. Thus, the closed loop transfer function is:

$$\frac{\theta_{out}}{\theta_{in}}=\frac{K\left[\frac{R_2Cs+1}{(R_1+R_2)Cs+1}\right]\frac{1}{s}}{1+K\left[\frac{R_2Cs+1}{(R_1+R_2)Cs+1}\right]\frac{1}{s}}$$

Where:

K=open loop gain.
$\theta_{in}$=Phase of the input signal.
$\theta_{out}$=Phase of the output signal.

Rearranging the above equation:

$$\frac{\theta_{out}}{\theta_{in}}=\frac{\frac{K(R_2Cs+1)}{(R_1+R_2)C}}{S_2+\frac{(KRC+1)s}{(R_1+R_2)C}+\frac{K}{(R_1+R_2)C}}$$

The square root of the last term in the denominator is the undamped natural frequency $\omega_n$.

$$\omega_n=\sqrt{\frac{K}{(R_1+R_2)C}}$$

At this point it is necessary to assume some reasonable values for $\omega_n$ and K. It will be shown later that the open loop gain K works out conventiently to be 50 $sec^{-1}$. Also if $\omega_n$ is equal to 1 radian/sec, then the time constant of the filter ($R_1C$) can be easily found.

$$\omega_n=\sqrt{\frac{50\ sec.^{-1}}{(R_1+R_2)C}}=\frac{radian}{sec.}$$

$$(R_1+R_2)C=50\ sec.$$

If $R_1 \gg R_2$, then $R_1C=T_1$ and $T_1=50$ seconds.

The damping ratio for the loop is $$\xi=\frac{KR_2C+1}{2\sqrt{KC(R_1+R_2)}}$$

Where $\xi$=damping ratio.

If $R_2C=T_2$ and $R_1 \gg R_2$, then the equation for the damping ratio simplifies to:

$$\xi=\frac{KT_2+1}{2\sqrt{KT_1}}$$

$T_2=R_2C$
$T_1=R_1C$ where $R_1 \gg R_2$

A damping ratio of 0.7 should be used for a near optimum linear second-order filter. This would minimize noise power and would also keep the phase error within given boundaries for a step frequency change.[1] Substituting the previous values of gain ($k$) and $T_1$, the time constant $T_2$ of the filter comes out to be:

$$\xi=\frac{(50\ sec.^{-1})T_2+1}{2\sqrt{50\ sec.^{-1}\times 50\ sec.}}=0.7$$

Where $T_2=R_2CT_2=1.4$ seconds.

With a damping ratio of 0.7, the response of the system to a unit phase input is 3 seconds.[2] This is a reasonable length of time since the message to be decoded is repeated several times during a satellite pass.

In order to draw a root locus plot of the loop, the open loop transfer function must be considered. This transfer function is:

$$KGH=K\left[\frac{T_{2s}+1}{T_{1s}+1}\right]\frac{1}{s}$$

Where

K=Open loop gain
G=Forward loop transfer function
H=Feedback transfer function

Substituting previous values of $T_1$ and $T_2$ and dividing the numerator by $T_2$ and the denominator by $T_1$.

$$KGH=K\left(\frac{1.4}{50}\right)\left[\frac{s+\frac{1}{1.4}}{s+\frac{1}{50}}\right]\frac{1}{s}$$

From the function inside the brackets, the root locus plot will have a pole at 0 at $$-\frac{1}{50}$$

and a zero at $$\frac{1}{1.4}$$

The root locus can now be drawn as shown in FIGURE 3B.

The curve shows that the present operating point is at a damping ratio of 0.7. The root locus plot also indicates that the circuit will be stable for any loop gain (K). As will be shown later, the gain of the system is proportional to the input voltage levels and will vary from a high of 50 to a low of 0. The response ($\omega_n$) of the system is the distance from the origin to the operating point on the curve. As the gain decreases, the operating point moves to the right, so the response time to a unit phase step input will increase.

Also, the damping ratio $\xi$ is the cosine of the angle between $\omega_n$ and the abcissa of the graph. This angle will increase as the gain decreases, decreasing the damping of the system and causing overshoot to occur. Thus, a decrease in circuit gain will effect the system's response, however, the loop will be stable for all operating conditions.

Since this is a second-order or type 1 servo system, it will have a 0 steady-state error for a phase-step input and a constant error for a phase-ramp input. Consider a phase-ramp input$=\theta_r/S^2$ $$\theta_e=\lim_{s\to o} s\left(\frac{\theta_r}{S^2}\right)\left[\frac{1}{1+K\left[\frac{T_2s+1}{R_1s+1}\right]\frac{1}{s}}\right]$$

Where $\theta_e$=phase error

Taking the limit of $\theta_e$, as $s$ approaches 0, $$\theta_e=\frac{\theta_r}{K}$$

For a gain (K) of 50:

$$\theta_e=\frac{\theta_r}{50}$$

The largest allowable error for satellite timing is 3.5°, so:

$$\theta_e=\frac{\theta_r}{50\ sec.^{-1}}=3.5°$$

$$\theta_r=175\frac{degrees}{sec.}$$

Thus, the input frequency variations can be no larger than:

$$\frac{\theta_r}{S^2}=\frac{175°}{sec.}\times\frac{1}{360}\ \frac{cycle}{degrees}\approx 0.5\ cps.$$

Thus frequency change in the input signal from the satellite due to the Doppler effect is less than 0.005 c.p.s., so errors due to Doppler should be negligible. The gain is proportional to $\theta_r$, so the gain can theoretically be reduced by a factor of 100 before the Doppler variations could give a significant error.

The bandwidth ($B_n$) of the loop is shown by Breese et al.[3], to be:

$$B_n=\int_{-\infty}^{+\infty}|H_1(\omega)|^2df$$

Where $$H_1(s)=\frac{\left(\frac{KT_2}{T_1}\right)s+\frac{K}{T_1}}{s^2+\left(\frac{1}{T_1}+\frac{KT_2}{T_1}\right)s+\frac{K}{T_1}}$$

This is the closed loop transfer function shown previously, with:

$$T_1=(R_1+R_2)C$$

$$T_2=R_2C$$

Breese, et al., also show that the integral now becomes:

$$B_n=\int_{-\infty}^{+\infty}|H_1(\omega)|^2df=\frac{K\left(\frac{KT_2^2}{T_1}\right)+1}{4(KT_2+1)}$$

This is the equation of the loop bandwidth. The bandwidth can be calculated by using the values previously shown:

$$B_n=\frac{K\left(\frac{KT_2^2}{T_1}\right)+1}{4(KT_2+1)}$$

[1] Breese, M., Colbert, R., Rubin, W., and Sperrazza, P., "Phase-Locked Loops for Electronically Scanned Antennae Arrays," IRE Trans. on Space Electronics and Telemetry, vol. SET-7, December 1961, p. 99.

[2] Savant, C. J., Basic Feedback Control System Design, McGraw-Hill, New York, 1958, Fig. 1-12, p. 12.

[3] Breese et al., supra, pp. 96-97.

K=100 sec.$^{-1}$
$T_1$=50 seconds
$T_2$=1.4 seconds $$B_n=\frac{100\left(\frac{100\times1.4^2}{50}\right)+1}{4(100\times1.4+1)}$$

$$=0.72 \text{ rad./sec. or } 0.11 \text{ c.p.s.}$$

It is now possible to look at the circuits (FIGS. 4, 5, 6 and 7) used in the loop of FIG. 3. The first circuit in the loop 16 is the area comparator 48, a four diode gating arrangement shown in FIG. 5. The upper and lower diode inputs are square waves used to gate the output of the comparator 48 on or off. With the square wave near ground on the upper gate and near the supply voltage on the lower gate, the input is allowed to pass the filter 46. When the square waves change state, the input is cut off and the output remains at the voltage on the filter capacitor 103. Since the input and output of the filter 46 are high impedance circuits, there is essentially no change in the capacitor voltage when the diode gate is turned off. The component values in the filter 46 are calculated from the time constants shown previously.

The next circuit in the loop is a voltage controlled astable multivibrator (VCO) 44 running at 400 c.p.s. (4 times the frequency of the signal coming into Phase Lock Loop 16). Varying the input voltage either side of −8 volts, changes the output by approximately 7 c.p.s. per volt. This input voltage comes from the filter 46 and depends upon the phase of the loop input waveform in relation to the phase of the VCO 44. With the VCO 44 lagging 90 degrees behind the input, the loop is phase locked and the voltage from filter 46 into VCO 44 is near −8 volts.

Figures 6, 8:
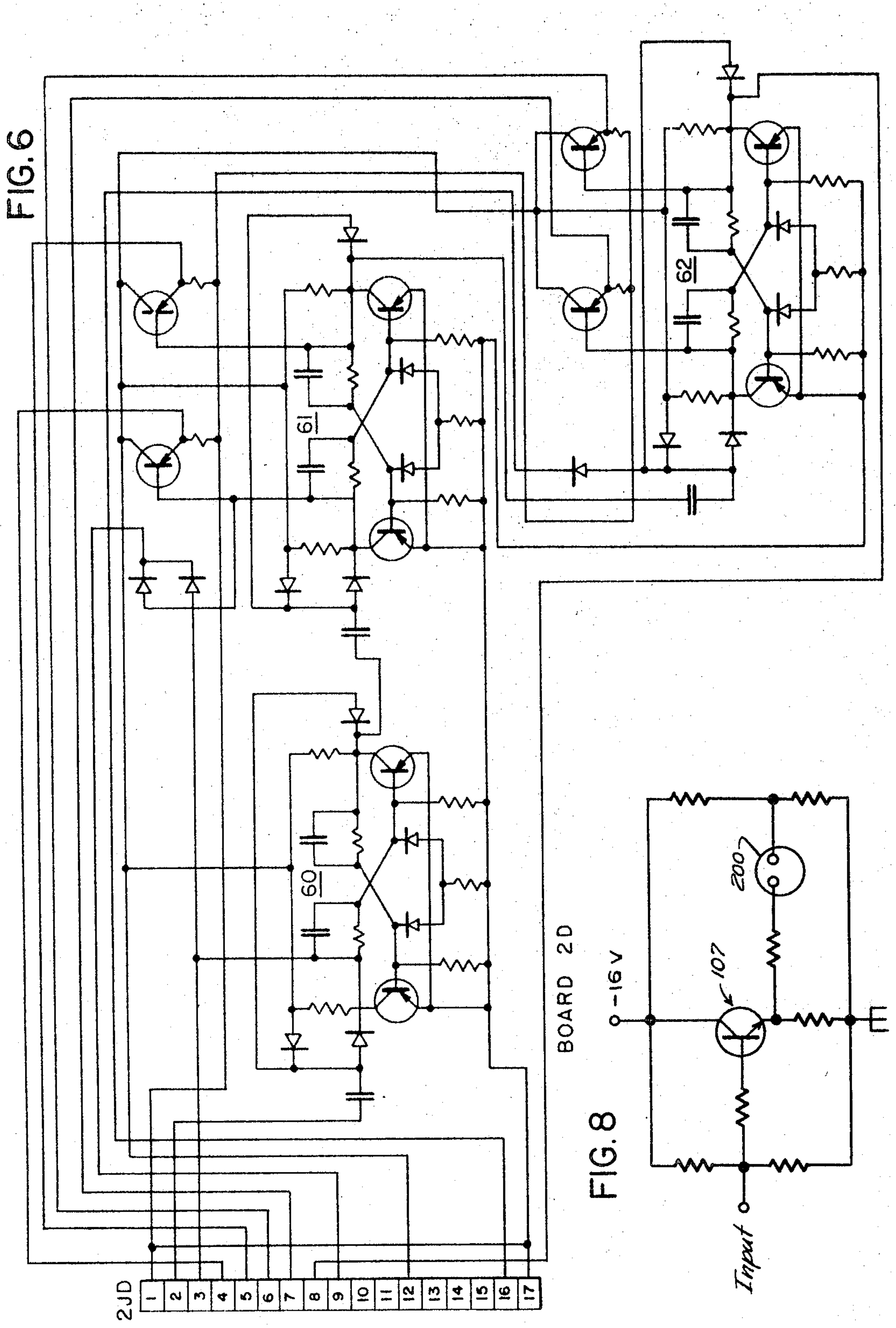
FIG. 8 is a circuit diagram of the lock meter circuit.
Figure 7:
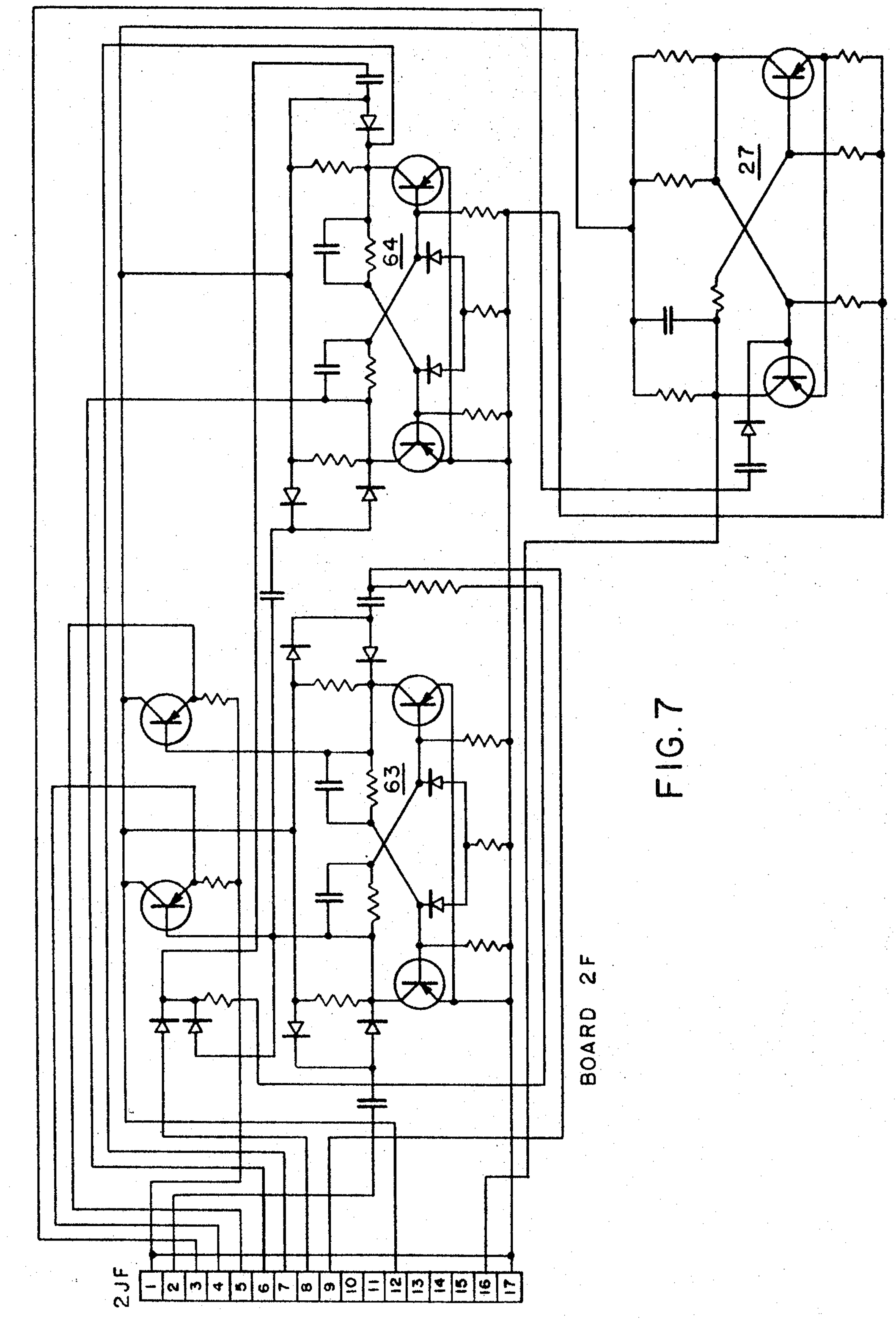

The BIT SYNC Error Detector 22 needs several gate signals which have a constant phase relationship with the input signal to the loop. In order to obtain these constant phase waveforms, the VCO 44 triggers a group of flip-flops. These flip-flops, shown in FIGS. 6 and 7, provide all of the gate signals used in the detector circuits. The block diagram, FIG. 3; shows the frequencies of the flip-flops in relation to the VCO frequency. For VCO frequency of 400 c.p.s., flip-flops V, W, and X are running 200 c.p.s., 100 c.p.s., and 50 c.p.s., respectively. Y flip-flop 63 is triggered by a diode gate such that the left collector of the flip-flop is always +90 degrees out of phase from the right collector of the 100 c.p.s. flip-flop above. The last flip-flop (Z) 64 is triggered in such a manner that it puts out a pulse at the beginning of each doublet input from the receiver.

Flip-flop (X) 62 is phase controlled by a pulse from the BIT SYNC Error Detector 22. If the flip-flop is not in the proper phase with the input doublet as shown in FIG. 1A, then the BIT SYNC Error Detector 22 feeds a pulse into a delay multivibrator 27 which inhibits one trigger pulse from flip-flop W. This results in a 180 degree phase change in flip-flop X. The phase relation of these flip-flops to the incoming signal is then properly synchronized.

The circuits preceding the Phase Lock Loop 16 are used to transform the doublet wave form into a square wave which can be used by the Phase Lock Loop 16. In order to make the change, the doublet is first rectified, then filtered and limited so as to provide a constant signal input amplitude to the Phase Lock Loop 16 over a wide range of signal-to-noise (S/N) ratios.

The doublet enters the top circuit as shown in FIG. 4. It passes through two impedance matching emitter followers 104, 105 and then into an amplifier 106 where the 3-volt peak-to-peak signal is amplified to 8-volts peak-to-peak. This signal then goes into a transistor phase splitter and diode full wave rectifier 42. The output of the rectifier 42 is a square wave with a period equal to one-half the period of the doublet. A very high impedance emitter follower circuit 43 follows to keep from loading the rectifier.

The circuits in the lower portion of FIG. 4 begin with a feedback amplifier 45 acting as a bandpass filter. The pass band is less than 10 c.p.s. on either side of the 100 c.p.s. input. The phase of the output is 180±20 degrees with respect to the input. This phase is set with the 10 k. potentiometer R61 shown at the end of the circuits. The output of the bandpass amplifier 45 is 12 volts peak-to-peak. This goes into a limiter 47 consisting of back-to-back diodes CR 50 and 51. The 0.5 volt limited signal is again amplified to 8 volts and fed into the Phase Lock Loop.

The limiter 47 accomplishes two purposes. First, it squares the sine wave coming out of the filter so that the Phase Lock Loop 16 has more gain. Second, a low amplitude output from the filter, which would occur with signal-to-noise ratios less than 1, will be of a constant amplitude going into the loop until the signal from the filter falls below 0.5 volt. Thus, the gain of the loop is held up over a wider range of S/N ratios than normally possible.

It is now possible to see the effects of noise upon the system. The Phase Lock Loop 16 is supposed to track an input signal with a −12 db S/N in a 3 kc. bandwidth. For S/N ratios less than 0 db, the diode rectifier 42 in the input circuit nearly doubles the noise expressed as db.[4] Thus, a −12 db S/N ratio at the input reduces to −24 db at the output of the rectifier 47. After being rectified, the signal passes through the 20 c.p.s. bandpass amplifier 51. The amplifier 51 decreases the bandwidth of the input signal by a factor of about 130. This increases the S/N ratio by 21 db so the signal going into the loop has an S/N ratio of −3 db in a 20 c.p.s. bandwidth. The 0.11 c.p.s. bandwidth of the loop reduces the input signal bandwidth by a factor of 108 which increases the S/N ratio by 23 db so the effective S/N ratio in the loop is +20 db in the 0.11 c.p.s. bandwidth.

For reliable acquisition of a signal, the S/N ratio should be +10 db.[5] Since the S/N ratio of the loop is well above this level, the loop should work successfully for the required input.

In actual use, the loop appears to hold lock for the required S/N input. However, the amplitude of the signal at −12 db S/N is down to a level near 1 volt at the input to the loop. Thus, the loop will probably track signals with much lower S/N than is now possible if another limiter and amplifier were used. This would bring the level of the loop's input signal to 8 volts for these low S/N ratios.

Lock meter drive

The output of board 2A also goes into the Quadrature Comparator 49. This circuit has gates which turn on when the input goes positive and off when it goes negative (consider the Phase Lock Loop 16 as now properly locked to the input signal). The average output level will be greater than when no signal is present or when the Phase Lock Loop 16 is not in proper phase. This signal passes from the Quadrature Comparator 49 to a meter circuit (FIG. 8) just behind the meter on the front panel. The meter circuit has an emitter follower 107 to provide the current to operate the meter 200. Since the meter response is slower than the input square wave, the meter 200 actually averages the gated input to indicate a DC level. The meter should show a constant amplitude if the loop is locked onto the input signal. An indication of proper phase lock is obtained from the meter circuit in FIG. 8 and the quadrature detector diode circuit 48' in FIG. 5. The diode comparator circuit 48' is gated in phase with the input wave shape by flip-flop 63 so that the output is a

[4] Van Vorrhis, S. N., ed. Microwave Receivers. New York: McGraw-Hill, 1948. (Massachusetts Institute of Technology Radiation Laboratory Series, Vol. 23) pp. 211–212.

[5] Space Electronics Corp., "An Electronic Self-Focusing Tracking System," Final Report, Glendale, Calif., Nov. 1960 (Report No. 30R-1, Contract No. AF19(604)7238. Prepared for Air Force Cambridge Research Laboratories, Bedford, Mass.).

maximum when circuit 48 and the VCO, circuit 44, are in a locked condition. Any shift in phase would gate less of the maximum portion of the input wave and more of the minimum thus reducing the average output at point *d*. This output goes into emitter follower, transistor 107, FIG. 8 which drives meter circuit 200. Thus a maximum reading on the meter would be an indication of a phase locked condition.

What is claimed is:

1. Electrical circuit means for supplying gating signals in accurate timed relationship with a received signal comprising:

means for rectifying the negative portion of the received signal;

means for rectifying the positive portion of the received signal;

means for combining the rectified positive and negative portions of the received signal producing a resultant signal;

feedback amplifier means for amplifying said resultant signal;

said feedback amplifier having degenerative feedback loop means including a notch filter;

a diode limiter network receiving the output of said feedback amplifier;

high gain amplifier means receiving the output of said diode limiter network;

a voltage controlled oscillator; and a phase comparison circuit driven by said high gain amplifier means and connected to compare the phase of the output from said gain amplifier means and the signal from said voltage controlled oscillator and supply.

2. The circuit as defined in claim 1 wherein:

the received signal is a coded series of phase-modulated positive and negative going bits; and the signal resulting from the combined rectified portions of the received signal is a square-wave.

3. The circuit as defined in claim 2 wherein a meter is provided to indicate when there exists a proper timed relationship between said gating signals and the received signal.

4. The circuit as defined in claim 1 wherein a meter is provided to indicate when there exists a proper timed relationship between said gating signals and the received signal.

References Cited

UNITED STATES PATENTS 3,308,380 3/1967 Graves et al. -------- 325—346

OTHER REFERENCES

Sassler et al., "Communication Receiver for Ground Station," Electrical Communication, vol. 39, no. 1, 1964, pp. 92–97, 331–25.

ROY LAKE, Primary Examiner

S. H. GRIMM, Assistant Examiner

U.S. Cl. X.R.

325—346, 423; 331—26